C. S. LOCKWOOD.
LOCK FOR ROLLER BEARING CASINGS.
APPLICATION FILED FEB. 13, 1911.
998,785.
Patented July 25, 1911.
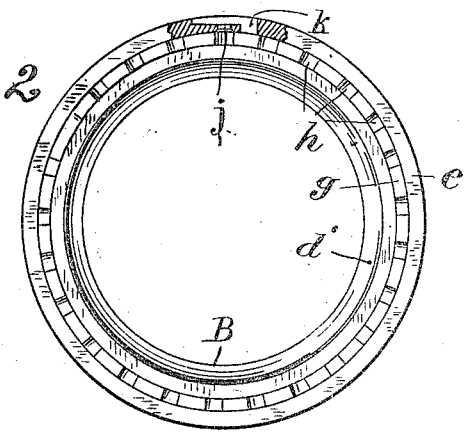
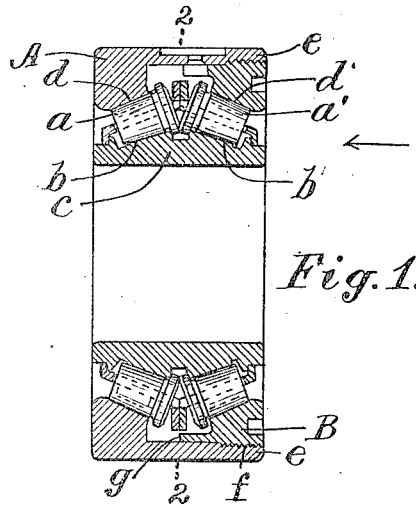
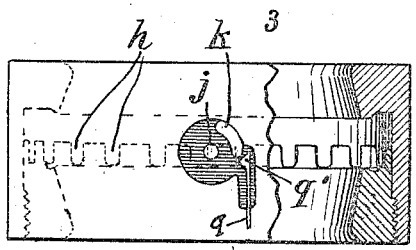
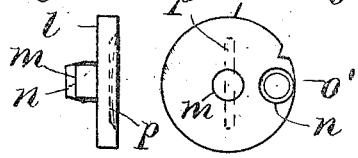
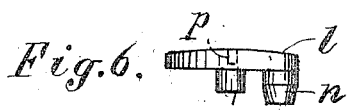
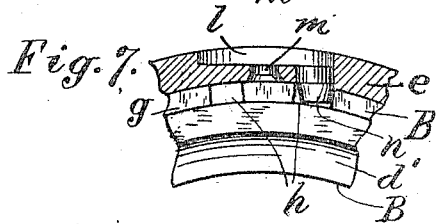
Witnesses
L. Lee.
Walter Greenbaum
Inventor
Charles S. Lockwood, Jr.
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

LOCK FOR ROLLER-BEARING CASINGS.

998,785. Specification of Letters Patent. Patented July 25, 1911.

Application filed February 13, 1911. Serial No. 608,457.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Locks for Roller-Bearing Casings, fully described and represented in the following specification and the accompanying drawings, forming a part of the same.

The present invention relates to a roller bearing having a two-part casing with one of the parts screwed upon the other to permit an adjustment of the seats which support the rolls, and the improvement consists in forming one of such parts with a series of notches, and the other part with a rotating disk having a stud adapted to engage, at pleasure, any of the said notches, so as to hold the adjustable part in its adjusted position. To avoid any tendency of the stud to turn voluntarily out of the notches, the stud when engaged with the notches lies in a circumferential line with the center of the disk, so that the thrust is wholly radial of the disk and has no tendency whatever to turn the same.

The invention is especially applicable to that class of self-contained bearings in which two series of rolls are mounted upon a doubly conical hub, and the casing is provided with two tapering seats adapted to embrace the outer sides of the two series of rolls, and in which one of the seats in such casing is adjustable toward the other for taking up lost motion and wear of the rolls. In such self-contained bearings, the exterior of the casing is often made cylindrical so that the bearing may be fitted into a suitable socket in any mechanical structure and there operate to support a rotating shaft or member. A locking-device applied to the exterior of the casing to hold the parts from displacement when adjusted should therefore be recessed into the exterior of the casing so as not to interfere with the fitting of the casing into a cylindrical socket. Various locking devices have been devised to accomplish this object.

My invention, therefore, consists in a special form of locking device which meets these requirements, and is shown in the annexed drawing, in which—

Figure 1 is a longitudinal section, where hatched, at the center line of a bearing embodying the invention; Fig. 2 is a section of the casing, where hatched, on line 2—2 in Fig. 1; Fig. 3 is an edge view of the casing alone, in section, where hatched, at the right hand side of the dotted line 3—3 in the same figure; Fig. 4 is an edge view, and Fig. 5 an outside view of the locking-disk; Fig. 6 is a side view of the locking-disk; Fig. 7 is a view similar to the upper part of Fig. 2 enlarged; Fig. 8 is an edge view of the bearing, and Fig. 9 an end view of a bearing showing an alternative construction.

Two series of rolls $a$, $a'$, are shown fitted to the opposite seats $b$, $b'$, of the doubly conical hub $c$, and one part A of the casing is provided with a tapering seat $d$ to embrace the outer sides of the rolls $a$, and the other part B with a tapering seat $b'$ to embrace the outer sides of the rolls $a'$. The part A having the seat $d$ is provided with a flange $e$ having an internal thread $f$, and the part B having the seat $d'$ is fitted to such thread for a portion of its length, and the remainder formed with an inwardly projecting flange $g$ having upon its edge a series of notches $h$ which are preferably made with parallel edges, as shown in Fig. 3. These notches are radial in their direction, and when the part B is rotated within the part A the movement is circumferential and the locking device must operate in resistance to such circumferential movement. Over such notches the exterior of the flange $e$, which forms a cylindrical periphery for the casing, is formed with a circular recess $i$ having a pivot-hole $j$ extended through the bottom to the interior of the flange, and the bottom of the recess is formed with a segmental slot $k$ at one side of the pivot-hole, at the edge of the recess. A locking-disk $l$ is made to turn movably in the recess and provided with a pivot pin $m$ to extend through the hole $j$ and be riveted upon the inner side as shown in Fig. 7, thus holding the disk movably in the recess. A locking-stud $n$ is projected inwardly from the disk through the slot $k$, and the slot is so related to the notches $h$ on the movable part of the casing, that the turning of the disk permits the stud to be moved into or out of such notches.

When moved into the notch, as shown in Fig. 7, the stud $n$ engages the opposite parallel walls of the notch and prevents the notched part B from any accidental displacement. The parallel walls of the notches are at right angles to the rotative movement of such part, and therefore exert a direct thrust upon the pin without any tendency to displace the pin or force it from the notch.

It will be observed by reference to Fig. 3 that the end of the slot $k$ which lies over the notches $h$ is in the same circumferential line as the hole $j$ and pivot-pin $m$ upon the center of the disk, so that any turning of the parts B and A in relation to one another would thrust the stud $n$ radially toward the center of the disk and not produce the slightest tendency to rotate the disk.

The exterior of the disk is shaped to conform with the cylindrical curve of the casing when the stud $n$ is engaged with any of the notches, and no part of the disk, therefore, projects beyond the cylindrical periphery of the bearing. A groove $p$ suitable to receive a screwdriver or flat wrench is formed upon the outer side of the disk for turning the same, and a spring $q$ is sunk in the periphery of the casing adjacent to the disk as shown in Fig. 3, and has a head $q'$ sloped in both directions, to engage a doubly sloped notch $o'$ on the edge of the disk when the stud $n$ is engaged with the notches $h'$. The spring operates as a detent to resist, in a yielding manner, any accidental displacement of the disk, but permits it to be turned for disengaging the stud $n$ with the notches $h$, and reëngages the notch on the disk when the stud is turned back into engagement with any of the said notches. The spring is chiefly useful to prevent the disk, if loose upon its pivot, from turning into accidental engagement with any of the said notches when screwing the parts of the casing together and adjusting them before locking.

I am aware that spring-dogs and pawls of various kinds have been employed for locking the parts of a casing, but it will be understood that the locking element of my device does not involve the operation of a spring but operates entirely independent of the spring $q$, by reason of the stud $n$ lying in the same circumferential line as the center of the disk when engaged with the notches $h$. I do not, therefore, claim a spring locking device, but the disk mounted upon the outer side of the casing and having a stud standing upon a circumferential line with the center of the disk when locking the parts.

Having thus set forth the nature of the invention what is claimed herein is:

1. In a roller or ball-bearing having a casing in two parts A and B with a flange $e$ upon the part A threaded internally and the inner part B fitted adjustably to such thread and provided with a series of radial notches $h$, the combination, with the said parts, of the locking disk $l$ fitted rotatably in a recess in the periphery of the flange $e$ and provided with the inwardly projecting stud $n$ and the flange having a slot $k$ extended through the bottom of the recess, permitting the movement of the stud, and the stud when turned into engagement with the said notches being in line with the center of the locking-disk.

2. In a roller bearing, the combination, with a doubly conical hub and two series of tapering rolls fitted thereto, of a two-part casing, one part having a cylindrical flange threaded internally and the other part fitted adjustably to such thread and each of the parts having a tapering seat fitted to the said rolls, a rotatable disk recessed flush in the periphery of the cylindrical flange and provided with an inwardly projecting stud, and the flange having a slot extended through the bottom of the recess, permitting the movement of the stud into and out of the said notches and the stud when turned to engage the notches being in a circumferential line with the center of the disk.

3. In a roller bearing, the combination, with a doubly conical hub and two series of tapering rolls fitted thereto, of a casing having two parts provided each with a tapering seat fitted to the said rolls, one part having a cylindrical flange threaded internally, and the other part being adjustable in the screwthread and having radial notches $h$ upon the edge as set forth, the flange being provided with a circular recess with a pivot-hole in the center of such recess and a segmental slot at one side of the same, a disk fitted flush in the said recess and having means for turning the same, and pivot riveted to turn in the pivot-hole, and having a stud projected through the said slot and arranged to turn into and out of the notches upon the adjustable part.

4. In a roller bearing having a two-part casing with the parts connected by screwthread, the combination, with one of the parts having a series of notches thereon, of a locking-disk mounted to rotate upon the other part and having a stud adapted, at pleasure, to engage any of the said notches and lock the notched part in relation to the other part, a spring operating upon the disk to exert a yielding resistance to displacement of the disk, and means for turning the disk in opposition to the resistance of the spring.

In testimony whereof I have hereunto set my hand in the presence of two subscribing witnesses.

CHARLES S. LOCKWOOD.

Witnesses:
 WILLIAM D. BROWN,
 IVY W. ASLIN.